United States Patent
DeBard et al.

(10) Patent No.: US 9,694,573 B2
(45) Date of Patent: Jul. 4, 2017

(54) COLD FOIL PRINTING SYSTEM AND METHOD

(75) Inventors: Michael DeBard, Red Bank, NJ (US); John Hopkinson, Cheadle (GB)

(73) Assignee: Diversified Graphic Machinery, Red Bank, NJ (US)

( * ) Notice: Subject to any disclaimer, the term of this patent is extended or adjusted under 35 U.S.C. 154(b) by 1199 days.

(21) Appl. No.: 13/374,259

(22) Filed: Dec. 19, 2011

(65) Prior Publication Data

US 2012/0193024 A1    Aug. 2, 2012

Related U.S. Application Data

(60) Provisional application No. 61/459,731, filed on Dec. 17, 2010.

(51) Int. Cl.
| | |
|---|---|
| *B32B 37/10* | (2006.01) |
| *B32B 38/18* | (2006.01) |
| *B32B 41/00* | (2006.01) |
| *B41F 19/00* | (2006.01) |

(52) U.S. Cl.
CPC ........ *B41F 19/001* (2013.01); *B32B 37/1045* (2013.01); *B41F 19/005* (2013.01); *Y10T 156/1741* (2015.01)

(58) Field of Classification Search
CPC ............. B32B 37/1045; B32B 37/1292; B41F 19/004; B41F 19/005
See application file for complete search history.

(56) References Cited

U.S. PATENT DOCUMENTS

| | | | | |
|---|---|---|---|---|
| 5,207,855 A | * | 5/1993 | Nyfeler | B41F 19/062 156/351 |
| 5,565,054 A | | 10/1996 | Lappe et al. | |
| 5,871,290 A | * | 2/1999 | Fujimoto | B65B 61/025 101/328 |
| 6,230,616 B1 | | 5/2001 | Steuer | |
| 6,334,248 B1 | * | 1/2002 | Gallagher | B41F 19/062 156/233 |
| 6,491,780 B2 | | 12/2002 | Gallagher | |

(Continued)

FOREIGN PATENT DOCUMENTS

GB          2457727 A  *  8/2009

*Primary Examiner* — Mark A Osele
(74) *Attorney, Agent, or Firm* — Brian K. Johnson, Esq., LLC

(57) ABSTRACT

A material deposition technique is disclosed for transferring material to a substrate. The material may be a foil on a carrier and the substrate may be printable paper. A computer-controlled, material application subsystem is provided having a material roller assembly including one or more material pressing rollers. The entire assembly is configured for controlled rotation such that the material pressing rollers alternately engage and disengage an impression cylinder. In a first rotatable position, the material roller assembly is rotated so that one of the material deposition rollers over which the material carrier is fed engages the impression cylinder and deposits the material onto the substrate as it passes beneath the roller. In a second rotatable position, the material roller assembly is rotated so as to disengage the material roller from the impression cylinder thereby precluding deposition of material onto the substrate as it passes beneath the roller.

12 Claims, 7 Drawing Sheets

(56) References Cited

U.S. PATENT DOCUMENTS

| | | | |
|---|---|---|---|
| 8,839,737 B2 * | 9/2014 | Weber | B41F 19/001 118/200 |
| 2007/0095483 A1 | 5/2007 | Krispin et al. | |
| 2007/0144661 A1 | 6/2007 | Puschel et al. | |
| 2007/0240590 A1 | 10/2007 | Presiner et al. | |
| 2009/0056864 A1 | 3/2009 | Walther | |
| 2009/0205772 A1 | 8/2009 | Franzen et al. | |
| 2009/0234511 A1 | 9/2009 | Presiner et al. | |
| 2009/0294038 A1 | 12/2009 | Jurkewitz et al. | |
| 2010/0314036 A1 | 12/2010 | Hazen | |

* cited by examiner

COLD FOIL PRINTING SYSTEM AND METHOD

CROSS REFERENCE TO RELATED APPLICATIONS

This application claims priority to the U.S. Provisional Patent Application Ser. No. 61/459,731, titled "Cold Foil Printing System and Method" filed on Dec. 17, 2010 the contents of which are herein incorporated by reference in its entirety.

STATEMENT REGARDING FEDERALLY SPONSORED RESEARCH OR DEVELOPMENT

Not applicable.

BACKGROUND OF THE INVENTION

The disclosure relates generally to a cold foil deposition system in which the use of cold foil is optimized. More specifically, the disclosure relates to the use of a moveable foil roller assembly, operated by a control unit that alternatively engages one or more foil rollers with an impression cylinder so as to deposit foil onto a substrate.

Various foil deposition systems are known that attempt to control the deposition of foil onto substrates as part of a printing process. U.S. Pat. No. 6,491,780, issued to Gallagher, provides one method of controlling the deposition of foil in which the speed of the foil carrier is varied during different portions of the foil transfer process. During an active transfer portion of the foil deposition process, a segment of the carrier is moved at the same speed as the substrate. In between active foil deposition segments, the foil carrier speed is sharply reduced, possibly even reversed, in order to maintain a slower average advancement speed of the foil carrier so as to match a reduced speed with which the foil is being deposited. A microprocessor-controlled shuttle mechanism, separate and distinct from any impression rollers or foil deposition rollers, is moved by a motor control system such that the foil transfer operation moves in synchrony with the speed of the substrate movement.

Other existing systems, for example U.S. Patent. Pub. Nos. US2007/0212490 and US2007/0212590, both to Preisner et al., disclose foil deposition systems in which a partial pressing surface is provided for on a press cylinder. The foil that is then fed between the press roller and an impression cylinder is only deposited on the substrate at the locations corresponding to the contacting portions of the partial pressing surface and the impression cylinder. As in Gallagher, Preisner et al. also discloses varying the advancement speed of the foil carrier by influencing the action of the foil advancement and collection rolls, including substantially stopping the foil advancement when no foil transfer is taking place. As a further refinement to the foil transfer process, Preisner et al. also discloses that the foil may be divided into one or more partial foil strips. In this instance, the foil roller control mechanisms of Preisner et al. control the foil advancement to substantially correspond with the presentation of the partial pressing surfaces so that foil roll contact is minimized and foil deposition is correlated only with the areas in which the partial pressing surfaces will be present.

Each of these systems involves the use of complex and correspondingly expensive custom pressing surfaces and/or motor controls to advance and halt the film. None of these systems solve the problem of managing selective foil deposition through computer-implemented control of a pressing roller assembly to achieve a more efficient foil deposition on selective areas of a printed substrate.

BRIEF SUMMARY OF THE INVENTION

According to one embodiment of the invention a material deposition method is provided including: transporting a substrate with an impression cylinder; advancing material from a material advancement unit to a material roller assembly, the material roller assembly having a material pressing roller; under the direction of a control unit that controls the material roller assembly, and alternately: contacting the impression cylinder with the material pressing roller by movement of the material roller assembly so as to cause the material to be deposited on the substrate; and releasing contact of the material pressing roller with the impression cylinder by movement of the material roller assembly so as to preclude the material from being deposited on the substrate.

According to various aspects of this method the advancing step starts and stops the material advancement with the material advancement unit in combination with the steps of alternately contacting and releasing, and the steps of alternately contacting and releasing are accomplished by the step of rotating the material roller assembly about a material roller assembly axis. Further, the steps of alternately contacting and releasing are accomplished by the alternate steps of moving the material roller assembly to and moving the material roller assembly away from the impression cylinder respectively; and the steps of alternately contacting and releasing are also accomplished by the step of rotating the foil roller assembly about a foil roller assembly axis in combination with the moving steps. With respect to other aspects, the method further includes applying an adhesive to the substrate by feeing the substrate between a blanket cylinder and the impression cylinder. Also, the method may be conditioned so that the material advancement unit includes an indexing unit, the step of advancing the material performed by the indexing unit such that the material is advanced in steps between the alternating steps of contacting and releasing; or the material is a foil and the substrate is a printing paper; or the impression cylinder includes grippers, or the step of releasing contact is automatically performed by the control unit when the grippers pass beneath the material pressing roller. In a final aspect, the method is practiced by the computer instructions contained on a non-transitory computer readable storage media, wherein the instructions, when executed by a processor, cause the processor to perform the steps.

According to another embodiment of the invention a material deposition subsystem is provided within a material deposition machine for depositing material on a substrate, the material deposition machine having an impression cylinder for transporting the substrate, the material deposition subsystem including: a material advancement unit having a roll of material on a material carrier, the material advancement unit dispensing the material carrier; and a material roller assembly having a material pressing roller, the material roller assembly accepting the material carrier from the material advancement unit, the material roller assembly being moved by a control unit so as to alternately provide contact and release contact of the material pressing roller with the impression cylinder, the material being selectively pressed by the material pressing roller onto the substrate transported by the impression cylinder when the material pressing roller is in contact with the impression cylinder.

According to various aspects of this embodiment, the material roller assembly includes a plurality of material pressing rollers and the control unit is a computer-based servo motor system, the servo motors being coupled to the material roller assembly, the control unit controlling the alternating contact and release contact of the material roller assembly and the material rollers with the impression cylinder. In other aspects, the control unit also controls the material advancement unit; the material advancement unit includes a foil unwind roll, a foil rewind roll and foil guide roller; the foil advancement unit includes an indexing unit, the indexing unit advancing the material in steps between the alternating steps of contacting and releasing; and the impression roller includes grippers for advancing the substrate, the material pressing roller being released of contact with the impression cylinder when the grippers pass underneath the material pressing roller. In still other aspects, the material deposition system includes a blanket cylinder, the blanket cylinder applying adhesive to the substrate using the impression cylinder prior to the material being pressed onto the substrate. Finally, the material is a foil and the substrate is a printing paper.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1A:
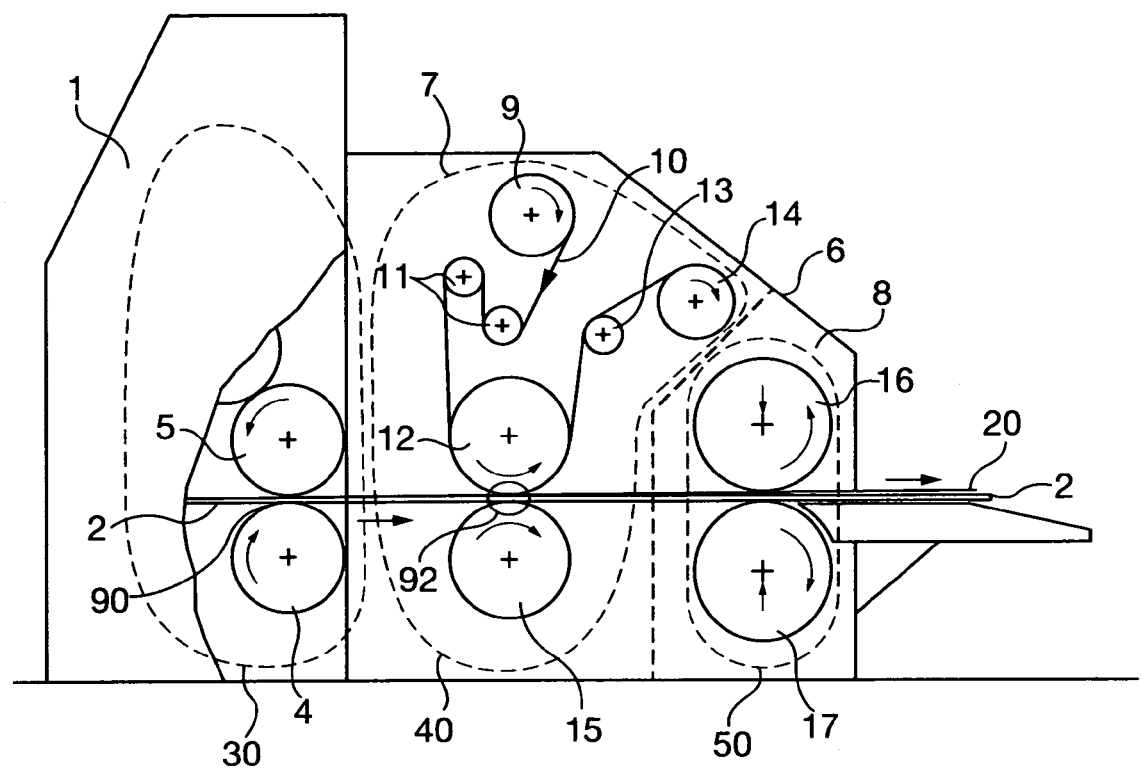
FIG. 1A is a diagram of a general prior art foil deposition system.

To facilitate a clear understanding of the present invention, illustrative examples are provided herein which describe certain aspects of the invention. However, it is to be appreciated that these illustrations are not meant to limit the scope of the invention, and are provided herein to illustrate certain concepts associated with the invention.

It is also to be understood that certain aspects of the present invention may be implemented in various forms of hardware, software, firmware, special purpose processors, or a combination thereof. This is particularly so with respect to the computer controlled aspects of the invention and the associated motor control operations disclosed below. In this regard, the computer-based portions of the present invention may be implemented in software as a program tangibly embodied on a program storage device. The program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the program (or combination thereof) which is executed via the operating system. In addition, various other peripheral devices may be connected to the computer platform such as an additional data storage device and a printing device.

It is to be understood that, because some of the constituent system components and method steps depicted in the accompanying figures are preferably implemented in software, the actual connections between the system components (or the process steps) may differ depending upon the manner in which the present invention is programmed. Specifically, any of the computers or devices may be interconnected using any existing or later-discovered networking technology and may also all be connected through a lager network system, such as a corporate network, metropolitan network or a global network, such as the internet.

Prior to the description of the present invention, a brief description of cold foil printing is presented. First, it should be understood that while the following disclosure is specifically described with respect to a coil foil printing processes on paper, the methods and apparatuses of the present invention are generally applicable to any material deposition process on a substrate. With respect to substrates, the teachings of the present invention apply equally to sheet or web formed substrates. In typical application, the material will be transported on a carrier and some type of assembly is used to shear the material from the carrier as it is applied to the substrate. After release and deposition, the material may be further processed and/or cured for a more permanent adherence to the substrate. Further the terms foil and transfer film are used alternately below to have the same meaning: a material carried by a material carrier.

Hot foil stamping was a process originally used to apply foil to printed products. In the hot foil stamping process, both heat and pressure are used to affix the foil to the printed sheet. In the context of a larger processing system, an intermittent drive system was introduced during the regular ink printing processes that advanced the sheets through the hot foil stamping press. However, numerous limitations existed in the printing capabilities of these hot foil stamping machines. The most disadvantageous of these was the need to process the hot foil application as part of an off-line, supplemental processing step; a step that is separate and distinct from the mainstream printing press processes. This significant departure from the in-line print processes precluded the use of hot foil processing as an efficient and cost effective method of foil application.

Cold foil printing is, now, relatively old. One of its first applications was in connection with narrow web flexographic printing. Since the introduction of cold foil printing, which is an adjunct to and thus far less prevalent than standard lithographic printing systems, a relatively limited number of cold foil systems have been designed and sold in the United States for use with lithographic printing presses. More recently, however, cold foil application systems have been engineered and designed to work with existing offset, sheet-fed lithographic printing press processes. In particular, cold foil stamping has recently achieved more sophisticated printing effects, including the ability to apply metallic foil to the sheet, in-line, at press speed, and providing a spectrum of available colors. Cold foil processes have been incorporated into exiting lithographic systems such that they utilize standard lithographic printing plates thereby providing a system ready to run and print (make-ready) within very short time periods. Most importantly, incorporation of coil foil deposition into the general printing processing has been simplified to the point that the machine operator requires no additional skills or training to use the cold foil system. Further, modern cold foil processes also allow for the creation of varying effects of foil and color. Spot foil can be added to accent a specific area and micro fonts, as small as 5 point, may be printed using cold foil techniques. Finally, reverse outs and tonal variations (i.e. quarter, half and full) may also be created. Spot foil accent may be add to specific areas of a design or applied to an entire sheet, thereby eliminating the need to purchase expensive, non-recyclable foil board. Cold foil application systems mount on top or at the end of the printing press and work within the parameters of the press' software operations and corresponding specifications. Converting back and forth between normal printing and cold foil applications is as simple as washing down the adhesive and re-inking rollers within a unit. Further, cold foil works with conventional and UV inks such that, after the sheet is printed, the foil can be encapsulated in a UV or aqueous coating. The finished product, accented by the luster of the foil, has a stamped effect that is superior to any metallic ink. In these regards, cold foil stamping capabilities surpass those available with either ink or hot foil stamping. Cold foil may easily be found in the printed products created in the following industries: advertising and promotion; book and magazine publications; CD, DVD and gaming jackets; beverage packaging; pharmaceutical packaging; greeting cards; cosmetic packaging; health and beauty packaging; and food packaging.

To achieve the above advantages, initial cold foil application systems typically used at least three printing units to apply cold foil. By way of general example, the first printing unit, also known as first printing station or printing group, was typically used to print an adhesive onto the desired areas of the substrate using a standard lithographic printing plate. The second print unit was typically used to apply the cold foil onto the substrate or sheet. This was accomplished by feeding the substrate between a blanket cylinder and an impression cylinder where the pressure applied by the impression cylinder transferred the cold foil to the substrate. In the third unit, the substrate was calendared (i.e. finished by pressing the substrate together between two rollers) to ensure complete adhesion of the foil to the printed sheet for later processing.

FIG. 1 is a diagram of a general cold foil prior art system, as generally described above. U.S. Pat. No. 5,565,054, issued to Lappe et al., discloses such a system as having at least two print housings 1 and 6. Within the first printing housing and unit 1, roller group 30 includes lower roller 4 and upper roller 5 for advancing the substrate between them. Upper roller 5 (also called a blanket cylinder) applies adhesive to the substrate portions as it passes underneath. The plates on roller 5 are configured with raised surfaces, or other suitable selective application mechanisms, such that the raised surfaces only are coated with adhesive. When the substrate passes between the rollers, the adhesive from roller 5 imprints upon the top surface of the substrate in the desired foil pattern. From the first print unit 1, the substrate passes to the second housing unit 6 which includes second printing station 7 (foil deposition) and third printing station 8 (a pressing unit). Printing station 7 contains roller group 40 which is responsible for advancing the transfer film 10 containing the foil from supply roll 9, around tensioning rollers 11, under printing roller 12, past intermediate roller 13 and up to collecting roller 14.

As shown in FIG. 1, the transfer of the foil to the substrate occurs at point 92 within roller group 40. Point 92 is actually a contact surface line between rollers 12 and 15 extending into the figure along the axis of the rollers. The transfer of the foil from the film to the substrate takes place exclusively at the locations of the substrate 2 that have been provided with adhesive as described above with respect to application of the same by roller 5. The construction of the film and the mechanics of the foil removal from the film are described briefly below. Upon leaving the printing station 7, the transfer layer adheres partially to the substrate in the location supplied by adhesive layer. In order to provide the required permanence, the substrate is advanced to pressing device 8 where it passed between upper, smooth-surfaced pressing roller 16 and lower roller 17. The pressure within pressing station 8 is sufficiently high to securely bond the foil to the substrate, and it is significantly greater than that needed in station 7 to generate the necessary initial adherence to remove the foil from the film and secure the foil to the adhesive.

Figure 1B:
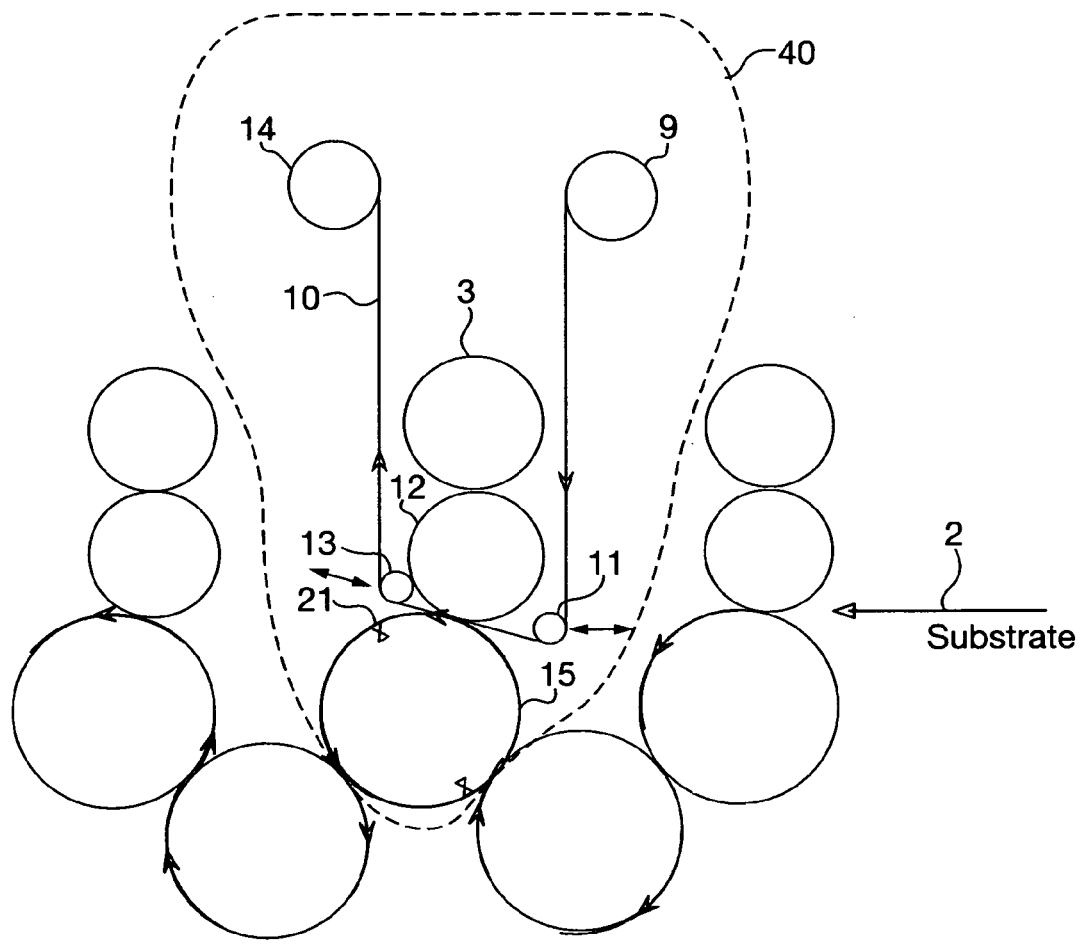
FIG. 1B is a diagram of a general prior art roller arrangement within a foil deposition system.

FIG. 1B provides an alternative embodiment of prior art film transfer systems with particular detail and attention being provided regarding the film transfer roller group 40. In FIG. 1B, the substrate 2 moves from right-to-left and is transported by a number of impression cylinders as shown by the arrows thereon. Within film transfer roller group 40, the carrier containing the foil 10 is unwound by the shaft on which unwind roller 9 is mounted and is rewound by the shaft on which rewind roller 14 is mounted. The shafts upon which rollers 9 and 14 are mounted are driven by servo motors used to control the start and stop operation of rollers and the advancement of the foil. The cold foil passes across the guide rollers 11 and 13 between the nip of the blanket cylinder 12 and the impression cylinder 15. Guide rollers 11 and 13 may also be motorized and configured to slide towards and away from the nip general roller area as shown by the arrows so as to increase and decrease the tension on the film 10.

Figure 1C:
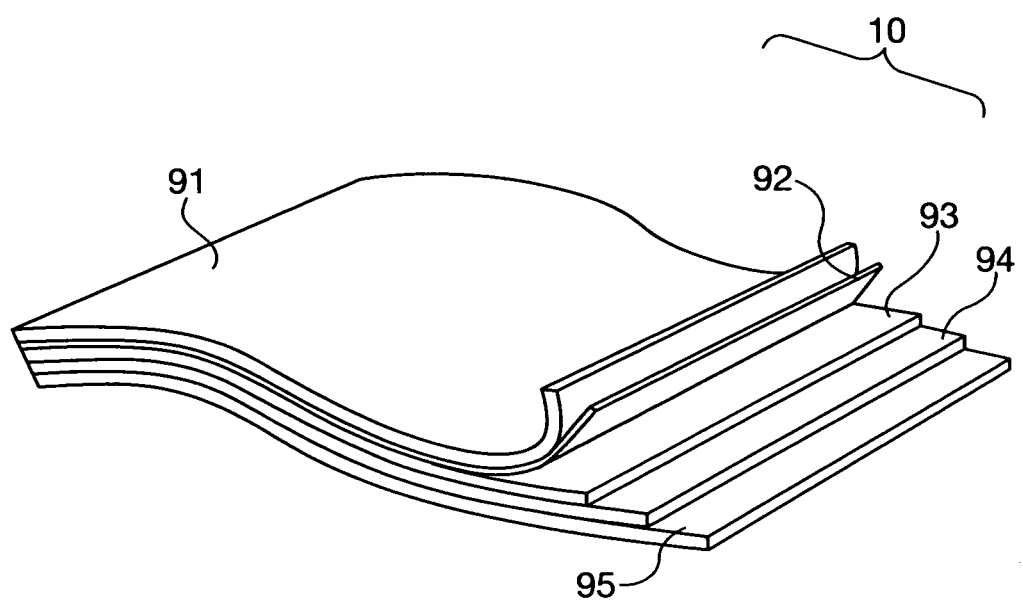
FIG. 1C is a layered diagram showing a cold foil composite used generally in connection with the foil deposition processes of the present invention.

While the film transfer methods and apparatus of the present invention may be practiced with respect to any type of material transfer, FIG. 1C provides an exemplary cold foil film 10 As. shown there, the cold foil film 10 consists of a five part laminate supported by a polyester carrier base 91. In preparation of the overall film, the polyester is first coated with a release coat 92 consisting of a release agent that separates from the polyester carrier when a sheer force is applied to the release coat vis-à-vis the carrier layer. Next, a lacquer color layer 93 is applied. The colored lacquer provides the desired colorization of the foil to be deposited and has historically been limited to silver or gold. However, modern chemical processing permits a full spectrum of colors at this layer. This three part laminate is then placed in a vacuum metalizing machine and coated with an aluminum metallization layer 94. Following this, a sizing layer 95 is coated to the back of the laminate. The sizing layer has an affinity for adhesives. During the film application process, the sizing layer 95 adheres to the adhesive on the substrate causing the release coat to sheer from the polyester carrier leaving the foil in the desired position on the substrate. The foil remaining on the carrier, corresponding to the non-adhered portions of the film, is later advanced for collection by the film rewind rollers.

Figure 2:
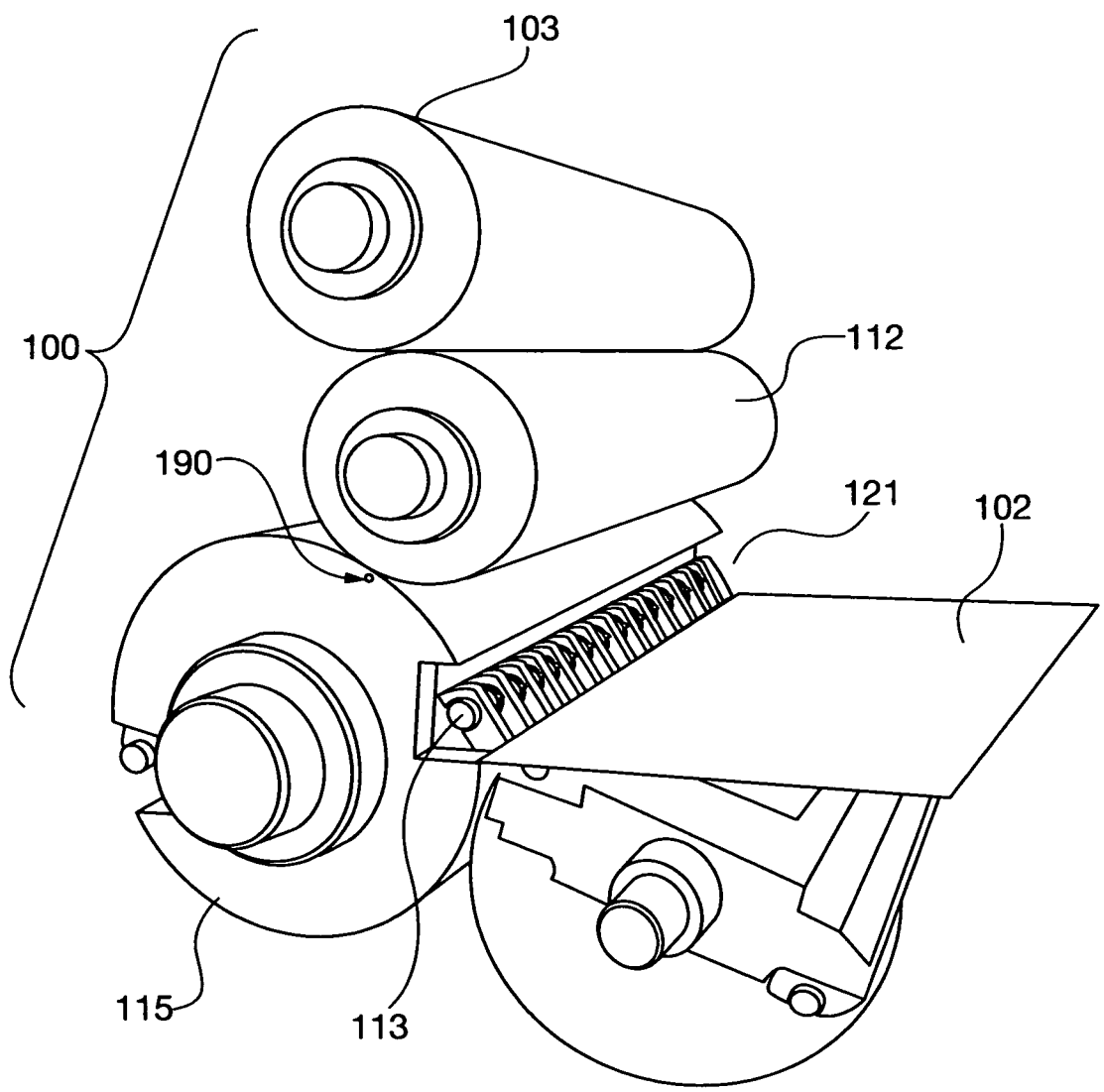
FIG. 2 is a three-dimensional diagram showing a roller arrangement that provides for substrate feeding according to one embodiment the present invention.

FIG. 2 shows an orthographic view of one unit of a typical three roller system. FIG. 2 is provided to illustrate the typical mechanism by which substrates are advanced through individual units that make up a typical lithographic press printing system. The film application portion of the system, i.e. the second printing unit including roller group 40 of FIG. 1B, is not shown in FIG. 2. Within the single unit, a series of rollers is provide that apply ink or glue to the substrate 102 together with the mechanical means to transport the substrate accurately through the press. There are three principal cylinders, the printing plate cylinder 103 the blanket cylinder 112 and the impression cylinder 115.

Three roller system 100 is provided for laying and transferring glue and pressing the same onto sheet 102 fed into the system. Plate cylinder 103 contains a plate with the lithographic image to be to be transferred to the sheet. Blanket cylinder 112 is in contact with the plate cylinder and receives the ink or glue from the plate cylinder, as is typical of an offset printing press processes. Impression cylinder 115 contains two grippers 121 having gripper teeth. The grippers are spring loaded on rod 113 so that the grippers depress into the cylinder when pushed toward the axis of the impression cylinder. Rod 113 and the grippers provide sufficient resistive force against sheet 102 when so depressed so as to grab the sheet and advance it between the impression cylinder and the blanket cylinder. During this portion of the process, the glue from the blanket cylinder is transferred from the blanket cylinder to the sheet in the areas outside the gripper. In some embodiments, the circumference of the print cylinder may be two times that of the blanket cylinder so as to allow for two sheets to be processed per print cylinder revolution.

The pattern of the resulting adhesive applied to the substrate is determined by the pattern laid onto the printing plate cylinder. This pattern is transferred to the blanket cylinder which is covered with a rubber blanket. The rubber blanket facilitates the pick-up of the adhesive and can possess varying degrees of hardness depending on the product being applied at that particular state. The blanket is fastened to the cylinder with special clips that sit in a recess known as the blanket gap.

The substrate is transported through the unit by the impression cylinder using a row of grippers 107 across its width. The grippers hold the sheet through the nip of the blanket cylinder and the impression cylinder and release it to the next transfer cylinder according to the timing of the press. The various cylinders are sized and their rotation speed timed such that the impression cylinder grippers, which protrude above the printing surface of the cylinder, meet the blanket gap as the blanket cylinder rotates over them so as not to cause damage to the blanket.

In feeding the sheet 102, the sheet is held against the impression cylinder by a series of grippers 121 across the cylinder length. The impression cylinder may be the same size as the blanket cylinder or a multiple of the sheet the circumference. In the later case two or more sheets are on the impression cylinder (115) at any one time and are held by two series of grippers at appropriate points along on the cylinder surface. To complete the transfer operation, the impression cylinder is pressed against the printing blanket at contact point 190 causing a pressure nip between them. As the sheet passes through the nip, the adhesive is transferred to the sheet.

Figure 3:
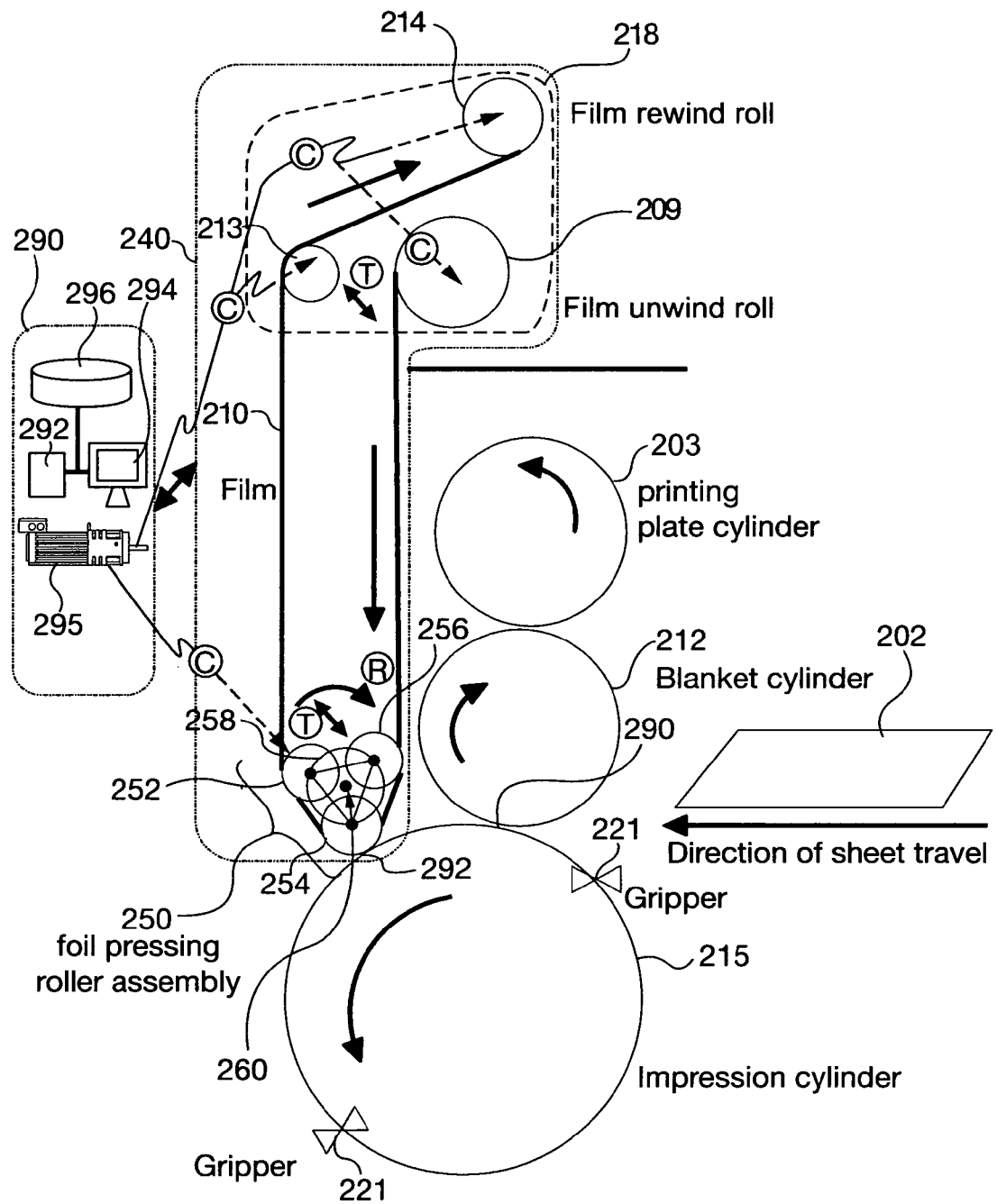
FIG. 3 shows a film pressing roller assembly in one operative position according a preferred embodiment of the present invention.

FIG. 3 shows one particularly preferred embodiment of a single unit lithographic printing system according to the present invention. Specifically, the foil does not pass between the impression cylinder and the blanket cylinder within the single processing unit of the present invention. Instead, the foil is contained within a foil application subsystem 240 that runs against the same impression cylinder that the adhesive application uses and immediately follows the application of that adhesive within the same unit. In this regard, the adhesive is applied in the above-described manner with respect to existing system with the foil coming into contact with and applied to the substrate against the impression cylinder at a subsequent radial rotation point on the rotation path of the impression cylinder.

Again with regard to FIG. 3, an adhesive is applied to the printing plate positioned on the print plate cylinder 203 and transferred to the blanket cylinder 212 in the desired printed pattern. In one particularly preferred embodiment of the present invention, impression cylinder 215 serves two impression functions. First, it acts as the first unit impression cylinder (i.e. for the first operational printing step) in which adhesive is applied as provided in connection with description above with respect to FIG. 2. The impression cylinder 215 includes grippers 221 and has a number of gripper fingers. Sheet 202 is advanced into the system between blanket cylinder 212 and impression cylinder 215. The sheet 202 is held by the spring-based pressing force of the grippers 221 against the blanket cylinder 212 as the cylinders rotate within the press. As the substrate passes between the nip of the impression cylinder and blanket cylinder under normal printing pressure, the adhesive is transferred to the substrate in the pattern desired at contact point 290. Foil application subsystem 240 consists of foil advancement unit 218 and foil pressing roller assembly 250. In one embodiment, foil advancement unit includes foil rewind and unwind rollers 214 and 209, and one or more associated the guide rollers, e.g. 213. In one embodiment, the roller assembly consists of a plurality foil pressing rollers (252, 254, and 256) which are mounted within a support carriage 258 that provides a structural support framework for the foil processing rollers. The foil pressing assembly is positioned away from the impression cylinder 215 on the downstream processing side from the adhesive application area 290 but sufficiently close such that rotation of the assembly brings one of the foil pressing rollers into contact with the impression cylinder 215.

In operation, two rotational mechanisms are at work within the foil processing roller assembly. First, each of the three foil pressing rollers rotate individually about their own cylindrical roller axes within foil roller assembly 250. Second, the entire foil pressing roller assembly rotates about its own assembly axis 260. As the foil roller assembly rotates, the individual foil pressing rollers are in a sequential contact with the impression cylinder. Since the assembly is at a fixed operational distance from the impression roller in this embodiment, rotation of the assembly causes alternating contact and release positioning of the rollers with the impression cylinder 215 at contact point 292. In this manner, carriage 258 rotates about a central axis 260, shown by the arrows outside the carriage in FIG. 3, in a circular rotating fashion, to cause an "on impression"/"off impression" function. In this manner, the assembly performs the second print unit function where the foil that is advanced around the assembly end is alternatively pressed into contact with and released from the impression cylinder during to the foil application process.

Further in reference to FIG. 3, foil or film 210 follows the general path from the foil unwind roll 209 down and around foil roller assembly 250, back up around guide roller 213 and onto foil rewind roll 214 where unused cold foil and carrier is collected. Foil unwind and rewind rollers 209 and 214 are advanced, started, stopped and reversed by servo motors connected thereto (shown logically as 295 but not shown physically within the foil flow diagram of FIG. 3). In one preferred embodiment, foil pressing roller assembly 250, individual foil pressing rollers 252, 254, and 256 and any other moving mechanisms such as guide roller 213 are moved, started, stopped rotated and reversed by these numerous servo motors connected thereto. Control unit 290 provides computer-based control of these electromechanical control apparatuses as provided in the description below.

Figure 4:
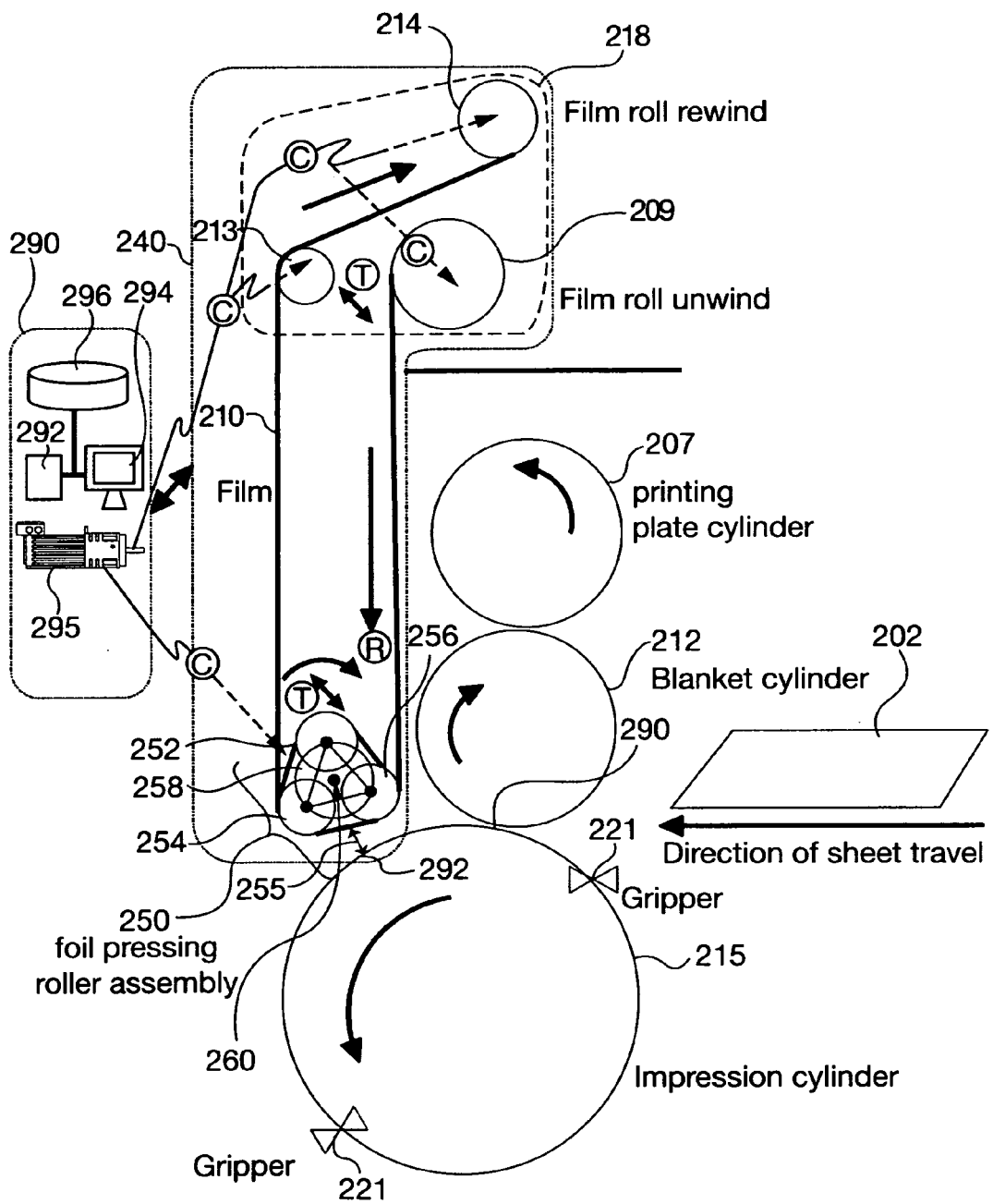
FIG. 4 shows a film pressing roller assembly in a second operative position according a preferred embodiment of the present invention.

FIG. 4 shows the disengagement position of foil processing roller assembly 250 after rotation of the assembly in the direction of the arrow. In FIG. 4, foil contact with the impression cylinder 215 is released and gap 255 is created between the foil processing roller assembly and the impression cylinder thereby precluding foil contact at point 292.

From the perspective of foil advancement, two circumstances are recognized in which the foil pressing rollers (252, 254 and 256) and assembly 250 disengage from the impression cylinder thereby releasing foil contact with the substrate. The first is when the grippers 221 pass below the foil pressing rollers at which point they must lift off the impression cylinder to avoid damage to the foil by the rollers. Damage is likely in this instance since the grippers on the impression cylinder extend beyond the circumferential dimension of the impression cylinder. Since foil pressing is never required in the area of the substrate contacted by the gripper, removal of the foil pressing rollers here has no effect on the printing process. The computer-based control system monitors the grippers positions at all times in relation to the rotation of the cylinder and the position of the foil pressing roller assembly. This is enabled via a signal from an encoder placed on the moving elements of the foil application subsystem and coupled to the control unit. Likewise, during the entire process of foil engagement and disengagement, the movements of the foil advancement unit 218, the foil pressing assembly 250 and the entire foil application subsystem (240) are controlled via a computer-based control unit 290 through the connected servo motors and electromechanical controllers 295. In a computer-based control unit, proprietary software running on the computer-based system is used to accomplish this. Regardless of engagement/disengagement position of the foil roller assembly 250, the computer-based control system maintains tension on the foil in an appropriate manner through manipulation of the guide and tension rollers, the unwind and rewind rollers and any and all other electromechanical components of the system. Foil tension may also be maintained by the servo controlled unwind and rewind system via motion control hardware and software contained within the overall foil application subsystem and associated computer-based control system.

The second case in which the foil roller assembly 250 is disengaged from the impression roller involves a step and repeat function of selective foil application wherein precise timing of the roller assembly contact with the impression roller is provided by the control unit. In this step and repeat operation, the assembly rotates so as to allow one of the foil pressing rollers to become in contact with the substrate and impression cylinder and transfer the foil portion of the cold foil laminate to the substrate after the grippers have passed the foil pressing roller assembly (250). Foil continues to be fed by the foil advancement unit during application as controlled by the control unit. Where foil is not required to be applied on the substrate, the foil pressing roller assembly 250 can be similarly rotated to lift the foil away from the surface of the substrate. At this point the control unit control locks the servo motors and does not allow the foil to move. In certain circumstances the foil can be moved backwards and rewound on the unwind roller 209. During the time the roller assembly and the foil are locked, the foil pressing rollers themselves (252, 254, and 256) may continue to rotate within the assembly 250 or may stop completely depending on the timing sequence of the foil repeat pattern. In this latter circumstance, the foil does not disengage from the rollers per se. Instead, the rollers spin and effectively skid against the polyester carrier.

When the print pattern again calls for foil to be applied, the foil advancement unit resumes feeding foil within the foil application subsystem 240 through the rotation of the unwind/rewind rollers, guide rollers and foil pressing rollers. Once the foil attains the line running line speed of the printing press and the foil roll pressing assembly as a whole rotates to engage contact between at least one of the foil pressing rollers and the impression cylinder at the position where foil is to be applied to the substrate.

The entire "step and repeat" operation (also called indexing) is carefully coordinated by and calculated within the control unit. As mentioned, the control unit is preferably a computer-based system under software control. All other foil application subsystem operations are likewise controlled by the control unit 290 which operates the servo motors and other electromechanical elements (collectively 295) under proprietary control software. Although the servo motors and other electromechanical elements (collectively 295) are shown logically as being within computer-based control unit 290 in FIGS. 3 and 4, the actual components are located at their respective positions within the foil application subsystem and are coupled to the computer-based control system via typical electronic and communication based protocols such as electrical hardwire control, Ethernet and WiFi. Other equivalent electrical and communication connection protocols are also applicable. At a minimum, computer unit is coupled to the foil assembly subsystem at least at to the shafts of foil unwind and rewind rolls and the foil pressing roller assembly 250.

The computer-based control system 290, includes a computer processor 292 coupled to a monitor/display system 294 and a database 296. The database contains control programming for proper operation of the foil application subsystem as well as design and print patterns and related information. The instructions within computer processor and its associated memory control the operation of the above-mentioned servo motors according to the operation of the invention as described herein. In a computer-based control system, the foil application subsystem and control unit may include motion control systems, operated by proprietary software, that control the rotation and movement of all foil application subsystem components so as to coordinate and keep time with the overall the printing press operation. Encoder signals are received at the control unit from the press indicating all press positions, currently operating functions and status.

As mentioned above, the foil pressing roller assembly is driven by a servo motor with associated drivers and electronic controls. The rotation of the foil pressing assembly is preprogrammed through control unit coordination to move the assembly to the off impression position so as to form gap 255 while the grippers 221 of the impression cylinder 215 pass beneath the assembly. When printing is desired, the control unit and associated computer system allows for print scheduling information to be input via a touch screen controller as part of display system 294. The control system, in turn, controls the foil pressing assembly 250 to rotate from the off impression to the on impression position, alternatively and repeatedly as necessary to deposit the desired foil pattern. The servo motors that control the shafts of the foil unwind roll 209 and foil rewind roll 214 are programmed to stop and start in time with the on impression or off impression of the foil pressing roller assembly. In this way, foil only advances over the foil impression roller assembly 250 when in the on impression position. Foil is held stationery when the foil roller impression assembly is in the off impression position as shown in FIG. 4.

When the foil unwind and rewind servo motors stop rotating, the foil impression rollers may or may not stop rotating depending on the pattern being applied. However even when these rollers remain rotating, the foil will be held stationery and the rollers will skid on the backside of the carrier surface. In one ideal arrangement of the foil impression roller assembly, a constant foil tension around the rollers is the maintained with the aid of such skidding whether a foil impression roller is in contact with the impression cylinder or not. Also, the positioning of the second impression roller immediately following a preceding foil pressing roller on impression is important in that the foil exit angle from the impression cylinder needs to be controlled to provide an effective foil laydown. To separate the foil portion from the polyester carrier and achieve a very even laydown of the foil, it is necessary to control the angle at which the two separate. The control unit manipulates the second roller position to accomplish this objective.

In the foil pressing position shown in FIG. 3, only one of the foil pressing rollers is shown as pressed against the surface of the substrate at point 292. In alternative embodiments of the invention, multiple foil roller assemblies may be provided downstream from the adhesive application point at various foil application points around the circumference of the impression cylinder. In this manner, the improved cold foil system of the present invention can be used with a single web of foil or multiple webs of foil so as to simultaneously apply more than one foil application in a single print pass. Similarly, foil pressing roller assemblies are envisioned as being flexible such that the positions of the rollers within the assembly may be adjusted under servo motor control. In this regard, the control unit may call for multiple impression cylinder contact at multiple points around the impression cylinder corresponding to multiple foil application locations 292. This arrangement would enable multiple areas of foil to be deposited onto the substrate simultaneously in a single on impression position. Finally, those of skill in the art will appreciate that the on impression and off impression positions may also be accomplished through translation (vs. rotation) of the foil pressing roller assembly in a direction towards and away from the impression cylinder respectively so as to create a gap at the impression roller. This direction is shown by the "T" arrow in FIG. 3 as contrasted with the assembly rotation indicated by the "R" arrow. Combined translational and rotational movement of the foil processing roller assembly may also be used to achieve the objects of the present invention.

Figure 5:
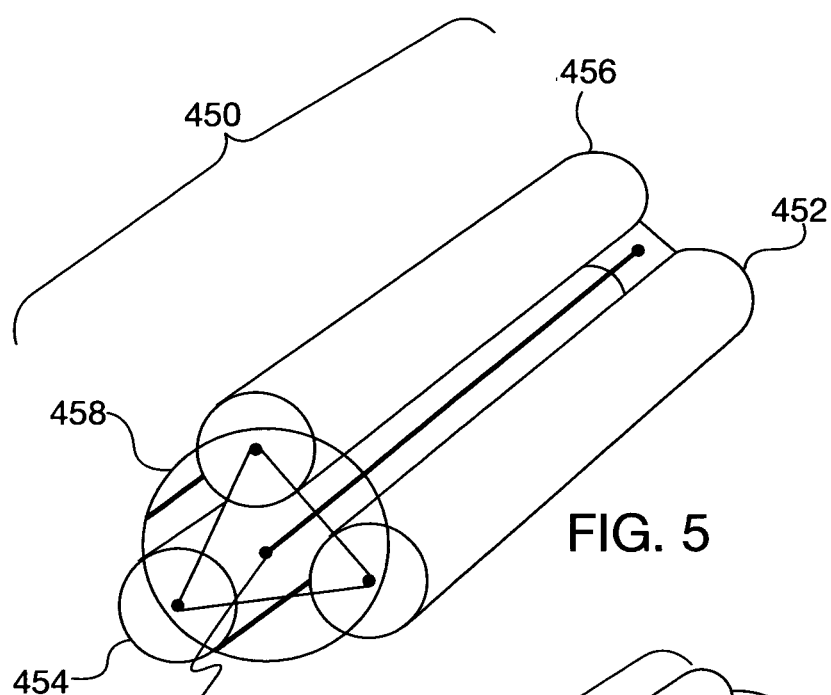
FIGS. 5-7 shows various arrangements of the film pressing roller assembly according preferred embodiments of the present invention.
Figure 6:
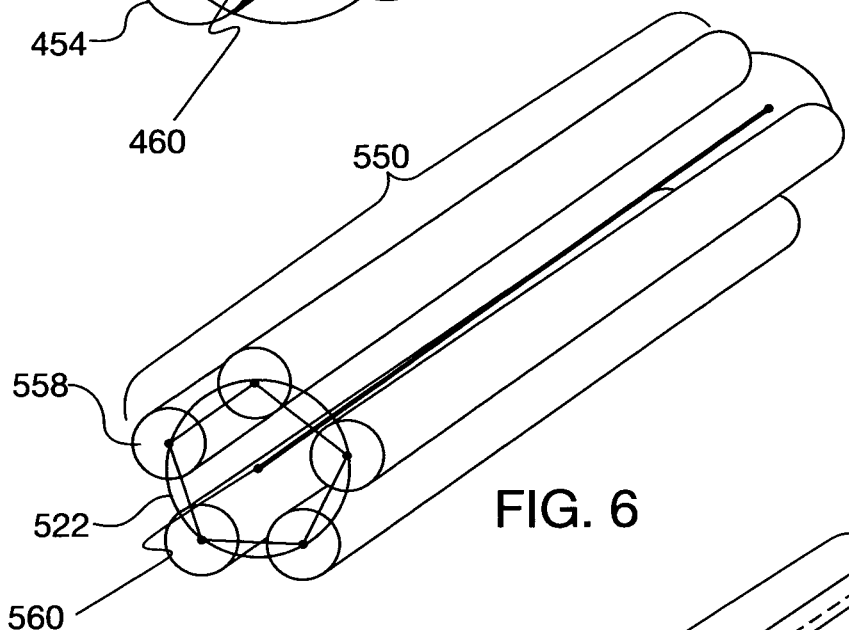
Figure 7:
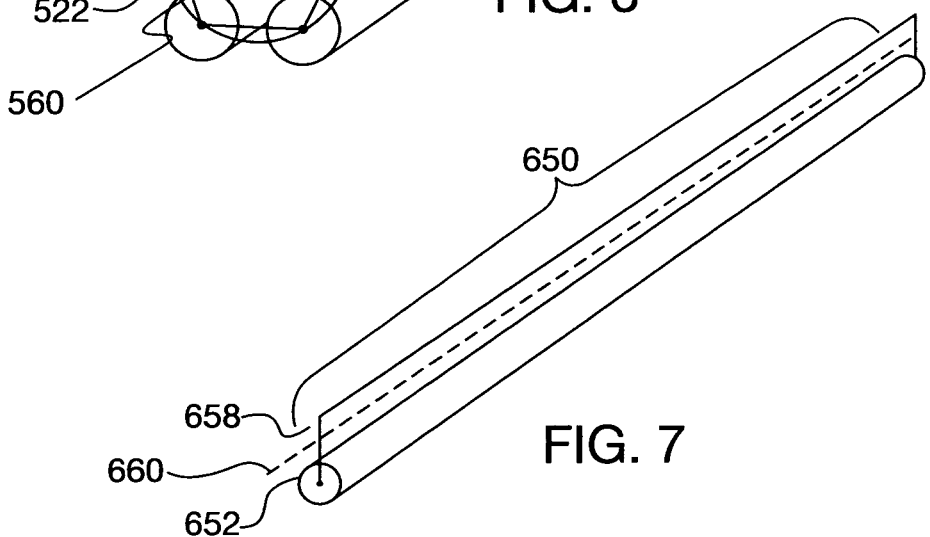

FIGS. 5-7 show several alternative arrangements of the foil roller assembly. As shown in FIG. 5 three foil pressing rollers (452, 454, 456) are housed within the support carriage 458. FIGS. 6 and 7 show a five roller and one roller arrangement respectively within the assembly. In each embodiment, the assembly operates in a similar manner with respect to rotational engagement with the impression cylinder wherein the assembly frame (458, 558, and 658) rotates so as to present each roller in turn to the on impression and off impression positions. In each of the embodiments, a single roller may be made to be in the foil on position by either one or both of rotation of the carriage about a carriage axis (460, 560 and 660 respectively in FIGS. 5, 6 and 7) or translation of the carriage in its entirety toward the impression cylinder. In one particularly preferred embodiment, the number of foil rollers in the foil pressing roller assembly varies between 3 and 5. Reasons for using different numbers of rollers might include the accommodation of a range of printing presses to which the system could be applicable and different physical spacing requirements of the same.

In a further aspect of the present invention, a system and method of cold foil "indexing" or "stepping and repeating" has been developed. Specifically, in another aspect of the invention, the cold foil application subsystem may function so as to "index" the cold foil to the specific area of the print job as needed for printing. This significantly eliminates wasted cold foil used within the printing process. In the case of un-indexed operation, the amount of cold foil used for depositing foil on a substrate is equivalent to the area of the blanket cylinder of the press in question irrespective of the actual amount of foil released to the substrate during the foil deposition process. The unused portion of the foil that remains on the polyester carrier is waste. The amount of wasted foil can be significantly reduced by controlling the foil advancement within the foil application subsystem such as by starting, stopping and rewinding the foil during the printing process. This non-continuous advancement of the carrier saves foil because significant areas of the foil are rarely used on a per sheet basis during each print job. Thus, indexing the foil advancement so as to only use a small percentage of printed foil for each rotation of the impression cylinder is preferred and provides a means for "spot printing."

A further refinement to the indexing function is that the unwind and rewind servo motors can reverse their movement in certain production circumstances. This effectively pulls back un-deposited foil through the press for reuse. Referring to the accompanying drawings, any suitable foil indexing system may be used in conjunction with the present invention to further realize the efficiencies in the foil deposition process. In one example, computer-based control unit 290 controls the server motors and other electromechanical components so as to execute the indexing process. In one preferred indexing system, the plurality of foil impression rollers (252, 254, & 256 FIG. 3) are revolved independently while the entire foil roller assembly is rotated around a central axis as controlled by the pattern generation software of the control unit. According to the stored pattern, the control unit causes the carriage and its rollers to contact the impression cylinder so as to alternate between on impression and off impression positions and thereby apply foil to selective areas of the substrate. As mentioned above, during the off impression portions of the foil application cycle, the foil advancement can be stopped (or even reversed to recycle an unused portion) before the next on impression so that maximal use of the foil from the foil roll is achieved. In this manner, the indexing system advances the desired amount of cold foil required for that specific job.

While the invention has been shown and described with reference to specific preferred embodiments, it should be understood by those skilled in the art that various changes in form and detail may be made therein without departing from the spirit and scope of the invention as defined by the following claims.

What is claimed is:

1. A material deposition subsystem within a material deposition machine for depositing material on a substrate, said material deposition machine having an impression cylinder and a blanket cylinder, said impression cylinder and said blanket cylinder rolling against one another to transport said substrate, said material deposition subsystem comprising:
   a material advancement unit having a roll of material on a material carrier, said material advancement unit activating said material carrier so as to transport said material to said substrate from said material advancement unit; and
   a material roller assembly having a roller assembly frame, said roller assembly frame supporting at least one material pressing roller, said material roller assembly accepting said transported material carrier from said material advancement unit, said material roller assembly being moved by a control unit so as to alternately provide contact and release contact of said material pressing roller with said impression cylinder, said material being selectively pressed by said material pressing roller onto said substrate transported by said impression cylinder when said material pressing roller is in contact with said impression cylinder.

2. The material deposition subsystem of claim 1 wherein said material roller assembly includes a plurality of material pressing rollers.

3. The material deposition subsystem of claim 2 wherein said material roller assembly rotates about a material roller assembly axis as said control unit alternately provides contact and release contact of said plurality of material pressing rollers onto said substrate and said impression roller.

4. The material deposition subsystem of claim 1 wherein said control unit is a computer-based servo motor system, said servo motors being coupled to said material roller assembly, said control unit coupled to said servo motors controlling the alternating contact and release contact of said material roller assembly and said material rollers with said impression cylinder.

5. The material deposition subsystem of claim 1 wherein said control unit also controls said material advancement unit.

6. The material deposition subsystem of claim 1 wherein said material advancement unit includes a material unwind roll, a material rewind roll and material guide roller.

7. The material deposition subsystem of claim 1 wherein said material advancement unit includes an indexing unit, said indexing unit selectivly advancing said material in steps between said alternating steps of contacting and releasing said material pressing roller with said impression cylinder.

8. The material deposition subsystem of claim 1 wherein said impression cylinder includes grippers for advancing said substrate, said material pressing roller being released of contact with said impression cylinder when said grippers pass underneath said material pressing roller.

9. The material deposition subsystem of claim 1 wherein said material deposition system includes a blanket cylinder, said blanket cylinder applying adhesive to said to said substrate using said impression cylinder prior to said material being pressed onto said substrate.

10. The material deposition subsystem of claim 1 wherein said material is a foil and said substrate is a printing paper.

11. A foil deposition subsystem, said foil deposition subsystem disposed within a foil deposition machine for depositing foil on a printed paper, said foil deposition machine having an impression cylinder and a blanket cylinder, said printed paper being gripped by said impression cylinder and fed between and said impression cylinder and said blanket cylinder, said foil deposition subsystem comprising:
   a foil advancement unit, said foil advancement unit including a foil unwind roller and a foil rewind roller, said foil unwind roller and foil rewind roller coupled to a computer-based control unit, said computer-based control unit including a processor and an associated memory, said processor executing computer instructions stored in said associated memory, said control unit coupled to a servo motor system, said servo motors being coupled to a foil roller assembly having at least one foil pressing roller, said unwind roller and said foil rewind roller being operated by said control unit to advance said foil around said foil roller assembly and said at least one foil pressing roller, said control unit operating said servo motors to move said foil roller assembly and said at least one foil roller so as to alternately provide contact and release contact of said foil pressing roller onto said impression cylinder and onto said printed paper fed between said impression roller and said blanket cylinder, said foil roller assembly rotating about a foil roller assembly axis as said control unit alternately provides contact and releases contact of said plurality of foil pressing rollers onto said substrate and said impression roller.

12. A foil deposition subsystem, said foil deposition subsystem disposed within a foil deposition machine for depositing foil on a printed paper, said foil deposition machine having an impression cylinder and a blanket cylinder, said printed paper being gripped by said impression cylinder and fed between and said impression cylinder and said blanket cylinder, said foil deposition subsystem comprising:
   a foil advancement unit, said foil advancement unit including a foil unwind roller and a foil rewind roller, said foil unwind roller and foil rewind roller coupled to a computer-based control unit, said computer-based control unit including a processor and an associated memory, said processor executing computer instructions stored in said associated memory, said control unit coupled to a servo motor system, said servo motors being coupled to a foil roller assembly having at least one foil pressing roller, said unwind roller and said foil rewind roller being operated by said control unit to advance said foil around said foil roller assembly and said at least one foil pressing roller, said control unit operating said servo motors to move said foil roller assembly and said at least one foil roller so as to alternately provide contact and release contact of said foil pressing roller onto said impression cylinder and onto said printed paper fed between said impression roller and said blanket cylinder, said impression cylinder having grippers, said step of releasing contact being performed by said computer-based control unit, said computer instructions within said computer memory being automatically performed by said control unit when said grippers pass beneath said foil pressing roller.

* * * * *